(12) United States Patent
Cicci et al.

(10) Patent No.: US 7,347,614 B2
(45) Date of Patent: Mar. 25, 2008

(54) SPLIT DRIVE APPARATUS FOR A VERTICAL MIXER

(75) Inventors: George B Cicci, Fitchburg, WI (US); Claude McFarlane, Fitchburg, WI (US)

(73) Assignee: Kuhn North America, Inc., Brodhead, WI (US)

( * ) Notice: Subject to any disclaimer, the term of this patent is extended or adjusted under 35 U.S.C. 154(b) by 308 days.

(21) Appl. No.: 11/010,306

(22) Filed: Dec. 14, 2004

(65) Prior Publication Data

US 2006/0126430 A1 Jun. 15, 2006

(51) Int. Cl.
*B01F 7/24* (2006.01)
(52) U.S. Cl. .................. 366/297; 366/603; 241/101.76
(58) Field of Classification Search ....... 74/665 G–665 GE, 11, 15.2, 665 F; 366/266, 297–301, 366/603; 241/101.71, 101.75, 101.76, 101.761, 241/605
See application file for complete search history.

(56) References Cited

U.S. PATENT DOCUMENTS

| | | | | |
|---|---|---|---|---|
| 114,328 A | * | 5/1871 | Nutter | 254/45 |
| 1,498,217 A | * | 6/1924 | Walker | 74/665 GC |
| 1,723,620 A | * | 8/1929 | Hottmann | 366/300 |
| 2,158,320 A | * | 5/1939 | Bock | 475/201 |
| 2,174,187 A | * | 9/1939 | Freitag | 180/24.1 |
| 2,344,388 A | * | 3/1944 | Bixby | 180/24.08 |
| 2,424,360 A | * | 7/1947 | Martin | 74/15.2 |
| 3,129,927 A | * | 4/1964 | Mast | 366/157.2 |
| 3,133,727 A | * | 5/1964 | Luscombe | 366/186 |
| 4,432,499 A | * | 2/1984 | Henkensiefken et al. | 241/30 |
| 5,429,436 A | * | 7/1995 | Stone | 366/141 |
| 5,456,416 A | * | 10/1995 | Hartwig | 241/260.1 |
| 5,462,354 A | * | 10/1995 | Neier | 366/314 |
| 6,409,377 B1 | * | 6/2002 | Van Der Plas | 366/297 |
| 2004/0008575 A1 | * | 1/2004 | Albright et al. | 366/299 |

FOREIGN PATENT DOCUMENTS

DE 200 10 221 U1 * 10/2000

OTHER PUBLICATIONS

English language abstract of DE 200 10 221 U1.*

* cited by examiner

*Primary Examiner*—David L Sorkin
(74) *Attorney, Agent, or Firm*—Oblon, Spivak, McClelland, Maier & Neustadt, P.C.

(57) ABSTRACT

A multiple auger vertical mixer with a drive system comprised of a powered driving means and a first gearbox with multiple output shafts. The output shafts supply rotational power for at least two final driven gearboxes which drive the augers.

26 Claims, 4 Drawing Sheets

SPLIT DRIVE APPARATUS FOR A VERTICAL MIXER

CROSS-REFERENCE TO RELATED APPLICATIONS

Not Applicable

FIELD OF THE INVENTION

This invention relates to a drive apparatus for mixers, and in one embodiment, the present invention is directed to a vertical-type feed mixer with multiple augers.

BACKGROUND OF THE INVENTION

Agricultural mixers are used for mixing hay and silage together with other nutrients including animal feed supplements and grains. These feed materials are then discharged and fed to various livestock such as cattle and dairy cows. Sometimes the mixing of such feed includes depositing a whole round or square bale of hay into the mixer. The mixer then cuts and processes the bale into the desired consistency before and during the mixing of the other feed nutrients.

In known mixers, there are many different configurations including horizontal augers, reel type arrangements, and vertical augers. In the vertical auger type mixers, there are single auger designs and multiple auger designs. In multiple auger vertical mixers, each auger is typically driven using a right-angle gearbox of either helical gear or planetary type construction. The gearboxes are normally driven by a single PTO driveline from the tractor or truck, which turns at approximately 1000 RPM. This drive input is attached to the input shaft of the first gearbox, which drives two output shafts, one right angle output for the first auger, the other straight through for the second gearbox. A second driveline is attached to the straight through output shaft of the first gearbox and is connected to the input shaft of the second gearbox, which then drives the second auger.

A torque limiting device is typically installed before the first gearbox, to protect the entire drive system from overload. The torque disconnect device can be a ball type torque disconnect, slip clutch, shear pin, belt drive or other commonly used method of drive protection.

It is understood that the term "gearbox" is used as a generic description for a means of transferring torque, and could also be a chain or belt driven device without changing the intended function.

One disadvantage of having the PTO driveline attaching directly to the first gearbox is that the speed reduction required to slow the drive from 1000 RPM to approximately 36 RPM is significant, and often requires the use of an expensive planetary gearbox.

Another disadvantage of this drive arrangement is that the single torque limiting device must be sized to handle the full combined running load of the mixer. If one of the augers gets jammed, the torque on that one gearbox can easily exceed the gearbox capacity, without exceeding the rating of the torque limiting device. For example, a single torque limiting device might be set for 2.5 times the combined normal running load of the augers, which then exceeds the breaking strength of one single gearbox. If one auger became jammed, it would likely break the gearbox before the single torque limiting device would disengage. This disadvantage becomes even more pronounced when adding a third or additional augers operating on a single torque disconnect system.

Yet another disadvantage of this arrangement is that the drive protection is exactly the same for all augers, even though the needed torque for each auger may be unique.

SUMMARY OF THE INVENTION

Accordingly, it is an objective of the exemplary embodiment to provide a vertical mixer with at least two augers, which overcomes some or all of problems associated with known art devices and makes a considerable contribution to the art of mixing materials. Other objects and advantages of the invention are:

(a) to provide a mixer in which the drive is split into two or more separate mechanical drive systems, allowing independent control for each auger;

(b) to provide a mixer which has independent torque limiting devices for each auger;

(c) to provide a mixer which can utilize final driven gearboxes with lower torque ratings because of the independent protection;

(d) to provide a mixer which utilizes a reduction gearbox with two output shafts, to reduce the rotational speed of the drive before the final driven gearboxes, to allow the use of less expensive helical gearboxes instead of planetary gearboxes;

(e) to provide a mixer in which one auger can be started independently by using different torque settings on the torque limiting devices

BRIEF DESCRIPTION OF THE DRAWINGS

These and other advantages of the invention will become more apparent and more readily appreciated from the following detailed description of the exemplary embodiments of the invention taken in conjunction with the accompanying drawings, where.

DETAILED DESCRIPTION OF THE DRAWINGS

Figure 1:
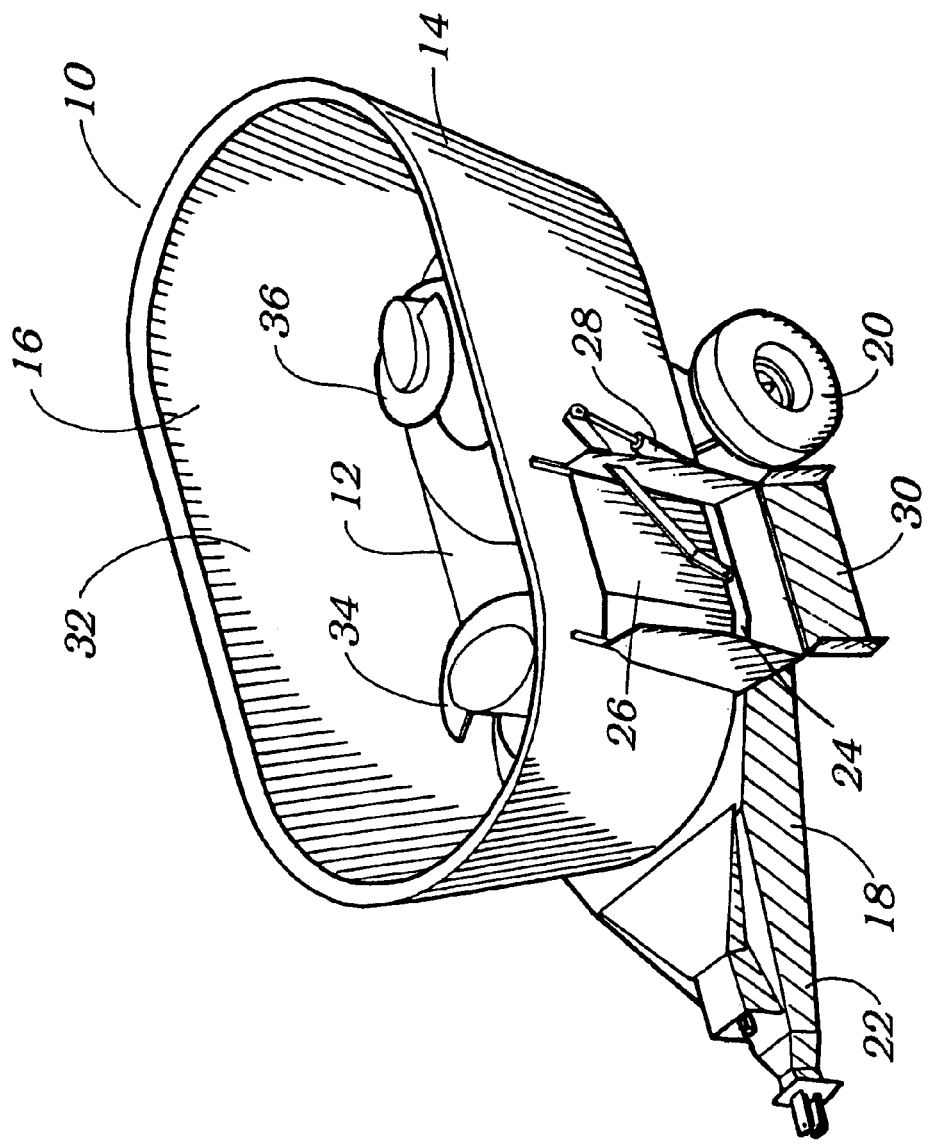
FIG. 1 is perspective view of a vertical feed mixer.

The invention is best understood from the following detailed description when read in conjunction with the accompanying drawings. With reference to FIG. 1, a vertical mixer (e.g., a vertical feed mixer for agricultural mixing) is generally designated by the reference number 10. The mixer includes a floor 12, a sidewall 14, and an open upper end 16. The mixer is mounted upon a frame 18, including wheels 20. A tongue 22 extending from the frame 18 is adapted to be hitched to a tractor or other prime mover. The sidewall 14 includes a discharge opening 24 with a discharge door 26 movable between open and closed positions by a hydraulic cylinder 28. A discharge chute 30 extends outwardly adjacent to the discharge opening 24.

The floor 12 and the sidewall 14 define a mixing chamber 32. A first auger 34 and a second auger 36 are rotatably mounted within the mixing chamber 32.

Figure 2:
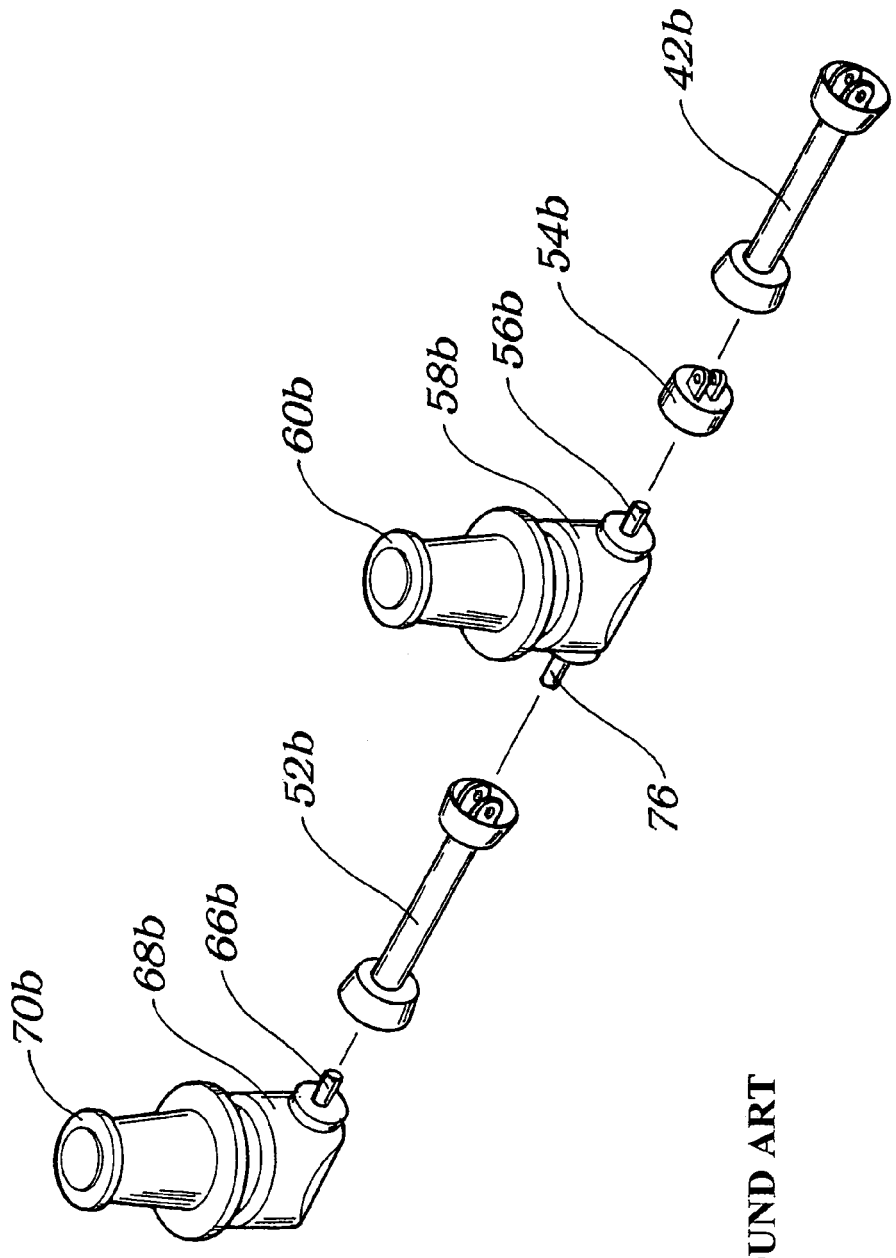
FIG. 2 is a perspective view of a known background art drive configuration.

With reference to FIG. 2 which shows a known conventional vertical mixer drive, FIG. 2 includes a powered driving means 42*b* which could be a driveline or other connection from a tractor PTO, truck PTO, or other electric or hydraulic power source. The powered driving means 42*b* connects to a torque limiting device 54b, which then attaches to the final drive input 56b of the final driven gearbox 58b. A final drive output 60b of the final driven gearbox 58b is attached to the first auger 34 to provide rotational power for the mixing of ingredients in the mixing chamber 32.

A final driven gearbox output 76 of the final driven gearbox 58b is connected to the gearbox driveline 52b. The gearbox driveline 52b then attaches to the further final drive input 66b of the further final driven gearbox 68b. A final drive output 70b of the final driven gearbox 68b is attached to the second auger 36 to provide rotational power for the mixing of ingredients in the mixing chamber 32.

Operation

In operation, hay or other long stemmed forages in the form of large round or square bales are added into the mixing chamber 32 while the augers 34 and 36 are rotating. The augers 34 and 36 are powered by the split drive system 40, and cooperate with the sidewall 14 to cut the bulky hay into shorter lengths for feeding to the livestock. Additional feed materials including grains, silage, and other feed supplements are then added into the mixing chamber 32, and mixed with the hay.

At the completion of the mixing operation, the hydraulic cylinder 28 is actuated to open the door 26 so that feed materials can be discharged out of the discharge opening 24. The rotation of the augers 34 and 36 helps to push the feed materials out of the discharge opening 24 and onto the discharge chute 30 for delivery to the livestock feeding bunk or trough (not shown). The speed of the rotating augers 34 and 36 is normally around 24-45 revolutions per minute, but can be increased at the end of the load to discharge the feed materials more efficiently.

Those skilled in the art will recognize that the present invention embraces mixing alternative materials such as, for example: dirt, cement, concrete, food, resin, plastics, metal pieces and the like. This list is provided as illustrative rather than an exhaustive list.

Figure 3:
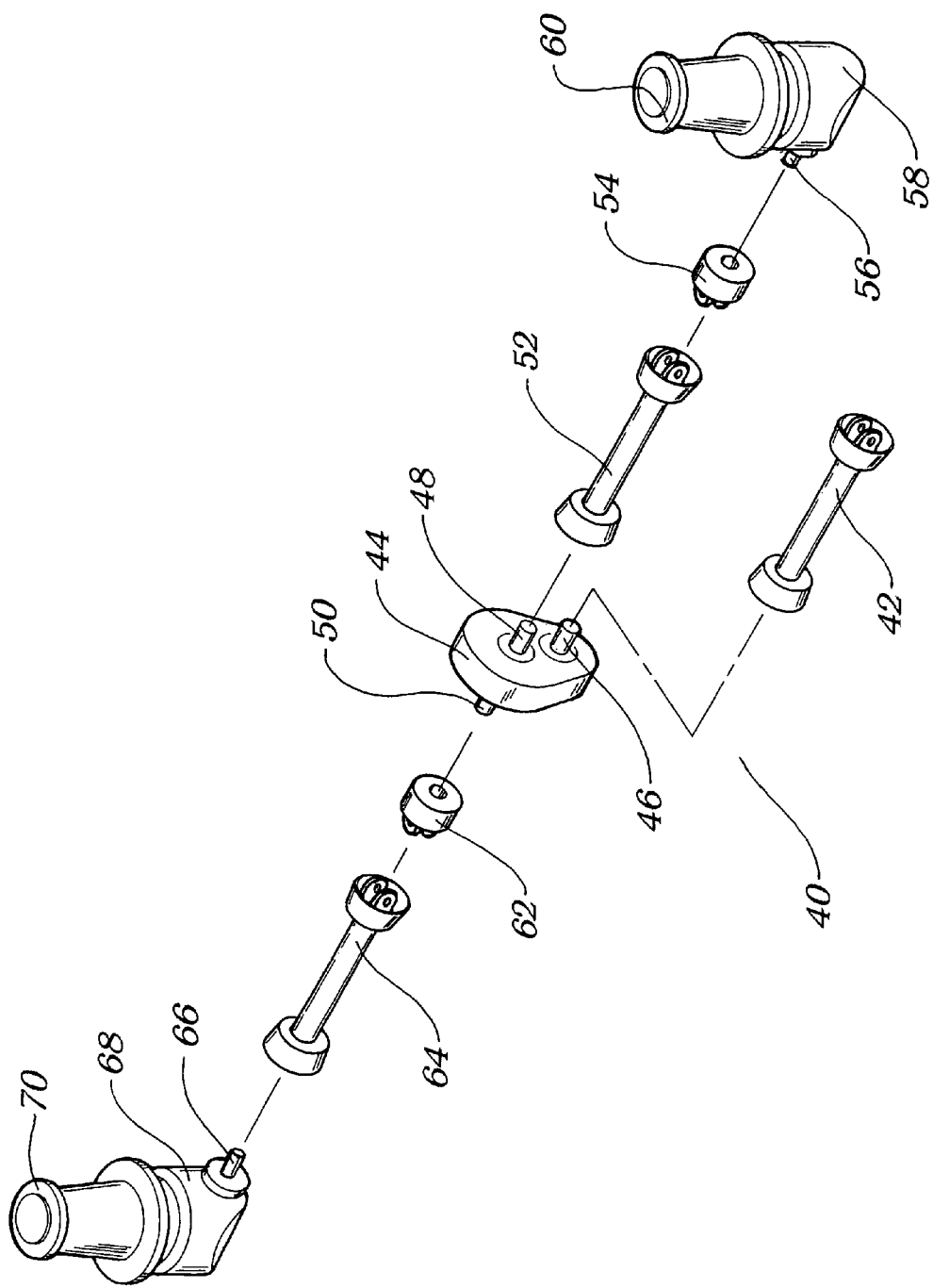
FIG. 3 is a perspective view of the split drive system shown in FIG. 1.

With reference to FIGS. 1 and 3, an embodiment of the present invention is disclosed in which a split drive system 40 provides rotational power to the augers 34 and 36, which turn inside the mixing chamber 32. The split drive system 40 includes a powered driving means 42 which could be a driveline or other connection from a tractor PTO, truck PTO, or other electric or hydraulic power source. The powered driving means 42 connects to a first gearbox 44 which has an input shaft 46, an output shaft 48, and a further output shaft 50. Persons of ordinary skill in the art will understand, "a further output shaft" to include one, two, three etc. additional output shafts.

As different arrangements of output shafts 48 and 50 may be advantageous in order to make different connection types, various arrangements of these output shafts are available. For example, in one embodiment, the output shaft 48 and further output shaft 50 are collinear. In another embodiment, the output shaft 48 and further output shaft 50 are offset (e.g. not collinear). Such arrangements may facilitate retrofitting of existing equipment with an embodiment of the invention, for example. Additionally, such arrangements allow equipment designers greater discretion in the placement of driven components such as augers.

Additionally, as the powered driving means 42 can be a tractor PTO, truck PTO or one of many other power sources, and it is advantageous to allow various combinations of input and output shaft arrangements. In one embodiment, the powered driving means 42 is collinear with an output shaft 48 or 50. In another embodiment, the powered driving means 42 is not collinear with any output shaft 48 or 50. Such varied combinations are important in order to accommodate the retrofitting of existing equipment and to allow equipment designers flexibility in locating connections to accommodate the various types of powered driving means 42.

The output shaft 48 of the first gearbox 44 is connected to a gearbox driveline 52, which is attached to a torque limiting device 54. The torque limiting device 54 is then attached to the drive input 56 of the driven gearbox 58. A drive output 60 of the driven gearbox 58 is attached to the first auger 34 to provide rotational power for the mixing of ingredients in the mixing chamber 32.

The further output shaft 50 of the first gearbox 44 is connected to a further torque limiting device 62, which is then attached to a further gearbox driveline 64. The further gearbox driveline 64 is then attached to the further drive input 66 of the further driven gearbox 68. A drive output 70 of the driven gearbox 68 is attached to the second auger 36 to provide rotational power for the mixing of ingredients in the mixing chamber 32.

In one exemplary embodiment, the torque limiting devices have equal torque limits. In another embodiment, the torque limiting devices have different torque limits. In yet another embodiment, the torque limiting devices have adjustable torque limits. In still another embodiment of the present invention, the torque limiting devices can be adjusted to a torque limit of zero, in effect, disconnecting the gearbox attached to that torque limiting device from the PTO.

Additionally, in other embodiments, a 3rd to Nth further output shaft of the first gearbox 44 is connected to a 3rd to Nth further torque limiting device, which is then attached to a 3rd to Nth further gearbox driveline. The 3rd to Nth further gearbox driveline is then attached to the 3rd to Nth further drive input of a 3rd to Nth further driven gearbox. A drive output of the driven gearbox is attached to a 3rd to Nth second auger to provide rotational power for the mixing of ingredients in a mixing chamber.

Although the mixing chamber shown in FIG. 1 has 2 augers in one mixing chamber, some embodiments of the invention include one or more augers in more than one mixing chamber.

Figure 4:
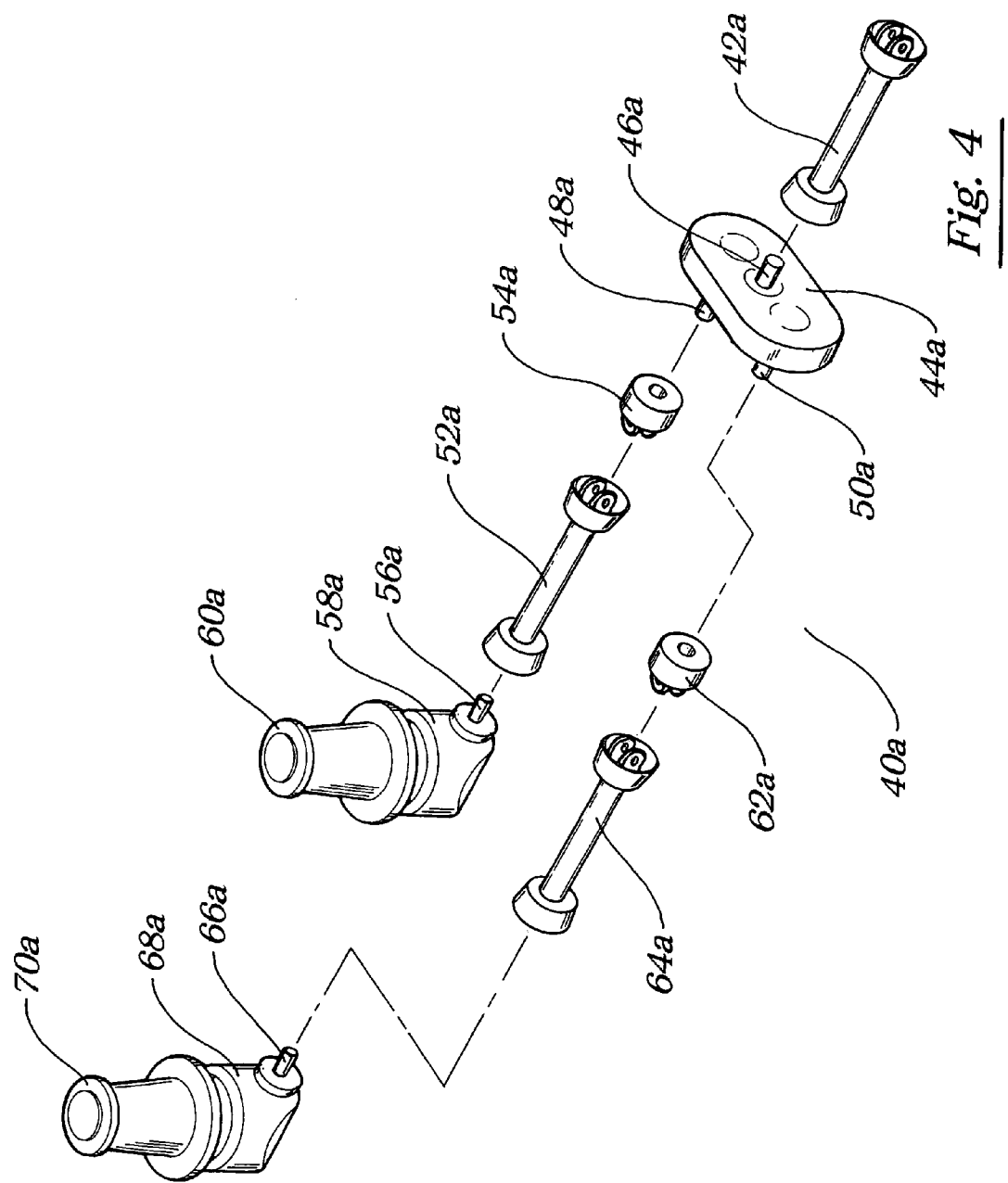
FIG. 4 is a perspective view of an alternative split drive system shown in FIG. 1.

With reference to FIGS. 1 and 4, an alternative embodiment is shown where a split drive system 40a provides rotational power to the augers 34 and 36, which turn inside the mixing chamber 32. The split drive system 40a includes a powered driving means 42a which could be a driveline or other connection from a tractor PTO, truck PTO, or other electric or hydraulic power source. The powered driving means 42a connects to a first gearbox 44a which has an input shaft 46a, an output shaft 48a, and a further output shaft 50a.

The output shaft 48a of the first gearbox 44a is connected to a torque limiting device 54a, which is attached to a gearbox driveline 52a. The gearbox driveline 52a is then attached to the drive input 56a of the driven gearbox 58a. A drive output 60a of the driven gearbox 58a is attached to the first auger 34 to provide rotational power for the mixing of ingredients in the mixing chamber 32.

The further output shaft 50a of the first gearbox 44a is connected to a further torque limiting device 62a, which is then attached to a further gearbox driveline 64a. The further gearbox driveline 64a is then attached to the further drive input 66a of the further driven gearbox 68a. A drive output 70a of the driven gearbox 68a is attached to the second auger 36 to provide rotational power for the mixing of ingredients in the mixing chamber 32.

According to one embodiment, the vertical mixer includes at least two augers, which are powered by the split drive system. The split drive allows each auger to be independently controlled and protected, both in the speed of rotation and the torque that is allowed to be transmitted to each auger. This feature provides improved power distribution and a higher level of safety for the drive components. In addition, the first gearbox allows the flexibility to reduce the driveline input speed before the driven gearboxes, allowing them to be sized and rated smaller for cost and weight savings. The split drive can also be designed to rotate the augers in opposite directions, to enhance certain types of material movement inside the mixer.

According to another embodiment, the gearbox 44 and gearbox 60 and/or torque limiting device 54 could be housed in a single housing, or combined into a single unit. Thus, retrofitting could be facilitated as fewer dimensions of other components would change. In appearance, this embodiment would have only two gearboxes, but in effect, three mechanically distinct gearboxes would be included.

In an alternate embodiment of the present invention, the augers are fitted with a number of blades, where the number of blades may be the same or different on the augers.

In yet another embodiment of the present invention, the augers may be either equidistant from the sidewalls of the mixer or they may be at distances that are different for one sidewall as opposed to the other.

In yet another embodiment, the sidewalls may further comprise protrusions or partial blockages that aid in the mixing of the material in the mixing area.

Although the description above contains many specifics, these should not be construed as limiting the scope of the invention but as merely providing illustrations of some of the presently preferred embodiments of this invention. Thus the scope of the invention should be determined by the appended claims and their legal equivalents, rather than by the examples given. From the foregoing, it can be seen that the present invention accomplishes at least some of the stated objectives.

What is claimed is:

1. A vertical mixer apparatus comprising:
   a frame;
   wheels configured to support the frame and to roll on a surface;
   a mixing chamber supported by the frame and disposed above the wheels with respect to the surface, the mixing chamber including a floor and a sidewall extending from the floor in a direction away from the wheels, the mixing chamber further including an open top on an end of the sidewall opposite the floor;
   a door configured to cover an opening in the sidewall;
   a split drive system including:
      a first gearbox disposed below a level of the floor with a first side and a second side opposite the first side and an input section disposed on the first side and configured to connect to a powered shaft, and first and second output shafts disposed on the first and second sides of the first gearbox, respectively, the first output shaft extending from the first gearbox in a same direction as the powered shaft extends from the first gearbox, and
      second and third gearboxes disposed below a level of the floor and drivingly connected to the first and second output shafts, respectively.

2. The mixer apparatus of claim 1 wherein said second gearbox is attached to a first auger, and said third gearbox is attached to a second auger.

3. The mixer apparatus of claim 1, further comprising a first torque limiting device drivingly connected between said first and second gearboxes.

4. The mixer apparatus of claim 3 further comprising a second torque limiting device drivingly connected between said first and third gearboxes.

5. The mixer apparatus of claim 4 wherein said first and second torque limiting devices have different torque limits.

6. The mixer apparatus of claim 4 wherein said first and second torque limiting devices comprise adjustable torque limiting devices.

7. The mixer apparatus of claim 1 wherein second and third gearboxes comprise right angle gearboxes.

8. The mixer apparatus of claim 1 wherein second and third gear boxes comprise planetary gearboxes.

9. The mixer apparatus of claim 1 wherein said powered driver comprises a power take-off driveline.

10. The mixer apparatus of claim 1 wherein the second and third gearboxes have different gear ratios.

11. The mixer apparatus of claim 1 further comprising first and second augers configured to connect to the second and third gearboxes respectively, wherein the augers comprise blades.

12. The mixer apparatus of claim 11 wherein the augers are asymmetrical.

13. The mixer apparatus of claim 11 wherein the augers are differently spaced from the walls of the mixer chamber.

14. The apparatus of claim 1 wherein the driven gear boxes are final gearboxes.

15. The apparatus of claim 1 wherein the first gearbox is configured to connect to more than two gearboxes.

16. The vertical mixer apparatus of claim 1, wherein the powered shaft and the first and second output shafts are parallel.

17. The vertical mixer apparatus of claim 1, wherein the first gearbox is disposed between the second and third gearboxes.

18. The vertical mixer apparatus of claim 1, wherein the first and second output shafts are collinear.

19. The vertical mixer apparatus of claim 1, wherein the first gear box is disposed in a first housing separate from a second housing in which the second gear box is disposed.

20. The vertical mixer apparatus of claim 19, wherein the third gear box is disposed in a third housing separate from the second housing and separate from the first housing.

21. A split drive apparatus for a vertical mixer comprising:
   a frame;
   wheels configured to support the frame and to roll on a surface;
   a mixing chamber supported by the frame and having a floor and a sidewall extending from the floor in a direction away from the wheels, the mixing chamber further including an open top on an end of the sidewall opposite the floor;
   a door configured to cover an opening in the sidewall;
   a first auger and a second auger mounted within the mixing chamber;
   a split drive system including:
      a first gearbox disposed below a level of the floor and with a first side and a second side opposite the first side and an input section disposed on the first side and configured to connect to a powered shaft, and first and second output shafts disposed on the first and second sides of the first gearbox, respectively, the first output shaft extending from the first gearbox in a same direction as the powered shaft extends from the first gearbox, and second and third gearboxes disposed below a level of the floor and drivingly connected to the first and second output shafts; respectively a torque limiting device configured to connect said first gearbox and said second gearbox; and a second torque limiting device configured to connect said first gearbox and said third gearbox.

22. The vertical mixer apparatus of claim 21, wherein the powered shaft and the first and second output shafts are parallel.

23. The vertical mixer apparatus of claim 21, wherein the first gearbox is disposed between the second and third gearboxes.

24. The vertical mixer apparatus of claim 21, wherein the first and second output shafts are collinear.

25. A method for driving a mixer comprising:

providing a frame;

providing wheels configured to support the frame and to roll on a surface;

providing a mixing chamber supported by the frame and disposed above the wheels with respect to the surface, the mixing chamber including a floor and a sidewall extending from the floor in a direction away from the wheels, the mixing chamber further including an open top on an end of the sidewall opposite the floor, the sidewall including a door;

connecting a powered driving means to a first gearbox disposed below a level of the floor with first and second sides such that the powered driving means is connected to the first side;

connecting a first output shaft disposed on the first side of the first gearbox to a second gearbox disposed below a level of the floor so that the first output shaft extends in a same direction from the first gearbox as the powered driving means extends from the first gearbox;

connecting a second output shaft disposed on the second side of the first gearbox to a third gearbox disposed below a level of the floor;

connecting at least one torque limiting device between said first gearbox and said second and third gearboxes.

26. A mixing apparatus comprising:

a frame;

wheels configured to support the frame and to roll on a surface;

a mixing chamber supported by the frame and disposed above the wheels with respect to the surface, the mixing chamber including a floor and a sidewall extending from the floor in a direction away from the wheels, the mixing chamber further including an open top on an end of the sidewall opposite the floor;

a door configured to cover an opening in the sidewall;

a first gear box disposed below a level of the floor, with respect to the surface, and configured to attach to a first auger and a second gearbox configured to attach to a second auger disposed above the floor;

means for distributing rotational power from a rotary power source to the first auger and to the second auger;

and means for individually controlling a torque threshold for each of the gear boxes;

wherein the means for distributing rotational power include first and second outputs disposed on first and second sides of the means for distributing and connected to the first and second augers, respectively, and the means for distributing power also include an input configured to connect to a powered shaft and disposed on the first side so as to extend from the means for distributing rotational power in a same direction as the first output extends from the means for distributing rotational power.

* * * * *